US006106651A

United States Patent [19]

Sieber et al.

[11] Patent Number: 6,106,651

[45] Date of Patent: *Aug. 22, 2000

[54] METHOD AND APPARATUS FOR BLEED-PRINTING AND METHOD AND APPARATUS FOR DECORATING A PAPER OBJECT

[76] Inventors: Jonathan D. Sieber, 20 Clubhouse La., Wayland, Mass. 01778; Joseph S. Sieber, 44 Dean Rd., Weston, Mass. 02193

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/004,533

[22] Filed: Jan. 8, 1998

Related U.S. Application Data

[63] Continuation of application No. 08/444,958, May 19, 1995, Pat. No. 5,730,826.

[51] Int. Cl.[7] .......... B32B 31/00; B42D 15/00

[52] U.S. Cl. .......... 156/247; 156/248; 156/268; 156/277; 283/117; 428/352

[58] Field of Search .......... 156/248, 277, 156/247, 268; 283/117; 428/352

[56] References Cited

U.S. PATENT DOCUMENTS

| | | | |
|---|---|---|---|
| 1,690,179 | 11/1928 | Sadtler | 156/277 |
| 2,391,539 | 12/1945 | Avery | 154/2 |
| 3,166,186 | 1/1965 | Karn | 206/56 |
| 3,524,782 | 8/1970 | Buske | 156/248 |
| 3,607,526 | 9/1971 | Biegen | 156/235 |
| 3,792,819 | 5/1973 | Horie | 24/625 |
| 4,190,478 | 2/1980 | Meisenberg | 156/252 |
| 4,219,596 | 8/1980 | Takemoto et al. | 428/41 |
| 4,253,899 | 3/1981 | Takemoto et al. | 156/277 |
| 4,479,838 | 10/1984 | Dunsirn et al. | 156/247 |
| 4,637,712 | 1/1987 | Arnold et al. | 355/75 |
| 4,873,643 | 10/1989 | Powell et al. | 364/468 |
| 4,876,131 | 10/1989 | Ashby et al. | 428/42 |
| 5,036,472 | 7/1991 | Buckley et al. | 364/479 |
| 5,133,819 | 7/1992 | Croner | 156/230 |
| 5,324,380 | 6/1994 | Marin | 156/247 |
| 5,370,762 | 12/1994 | Zukowski et al. | 156/154 |
| 5,428,423 | 6/1995 | Clark | 355/77 |
| 5,513,117 | 4/1996 | Small | 364/479 |
| 5,530,793 | 6/1996 | Watkins et al. | 395/117 |
| 5,546,316 | 8/1996 | Buckley et al. | 364/479.03 |
| 5,730,826 | 3/1998 | Sieber et al. | 156/268 |
| 5,825,996 | 10/1998 | Davis et al. | 395/117 |

OTHER PUBLICATIONS

Exhibit A—Monotype® brochure entitled "Discover a great new way to make personalized greeting cards and certificates!" (Monotype Typography, Inc.) (No date given.)

Exhibit B1—Catalog entitled "Paper Catalog," see for example pp. 31, 32, 35, 53, 54, 15A, 55–58, 61 and 69. (PaperDirect, Inc.). (No date given.)

(List continued on next page.)

*Primary Examiner*—Deborah Jones
*Assistant Examiner*—Robert R. Koehler
*Attorney, Agent, or Firm*—Wolf, Greenfield & Sacks, P.C.

[57] ABSTRACT

A method of bleed-printing, for example, social stationery, including the steps of attaching a sheet of paper to be printed to a carrier, printing on the sheet of paper so that the printed matter extends beyond at least one edge of a die-cut portion of the sheet of paper, and removing the sheet of paper from the carrier. The adhesive chosen is such that the sheet of paper is substantially free of adhesive after it is removed from the carrier. A method of decorating a napkin, including the steps of printing printed material on a label comprising directory paper, and attaching the label to a napkin using an adhesive.

33 Claims, 3 Drawing Sheets

OTHER PUBLICATIONS

Exhibit B2—Samples of preprinted stock (preprinted on one side) (items BC1355, BC0505, BC1065). (PaperDirect, Inc.). (No date given.)

Exhibit B3—Samples of preprinted stock (preprinted on both sides). (PaperDirect, Inc.). (No date given.)

Exhibit C1—three publications entitled "Door Hangers," AdjustaEasles™ & Slot Tents™ and Panel Cards & Postcards, respectively. (Laserblanks™). Copyright 1995.

Exhibit D1—Catalog entitled "Laser & Ink Jet Products," see, for example, pp. 14, 15, 17 and back cover of catalog. (Avery Dennison Corporation). (No date given.)

Exhibit D2—Laser card products information sheets with sample blank stock of product #5389. (Avery Dennison Corporation). (No date given.)

Exhibit D3—Publication entitled "Ink Jet Greeting Cards." (Avery Dennison Corporation), Apr. 1996.

Exhibit D4—Publication entitled "Laser Post Cards." (Avery Dennison Corporation), Aug. 1996.

Exhibit D5—Publication entitled "Ink Jet Business Cards." (Avery Dennison Corporation). (No date given.)

Exhibit E—Publication entitled "American Greetings CreataCard®Plus!™" (Micrografx and American Greetings). (No date given.)

Exhibit F—Publication entitled "Hallmark Connectins/ Microsoft®Greeting Workshop." (Microsoft and Hallmark Connections.) (No date given.)

Exhibit G—Publication entitled "Introducing INFINITE designs™." (InScribe, Inc.) (No date given.)

Exhibit H—Publication entitled "Micrografx and Hallmark Cards, Inc. Announce Creative Greeting Card Software on CD–ROM" and Hallmark Connections Card Studio ™. (Micrografx and Hallmark Cards, Inc.) (No date given.)

Exhibit A—Monotype®brochure entitled "Discover a great new way to make personalized greeting cards and certificates!" (Monotype Typography, Inc.). (No date given.)

Exhibit B1—Catalog entitled "Paper Catalog," pp. 1–107 and 1A–15A, and including pp. 31, 32, 35, 53, 54, 15A, 55–58, 61 and 69. (PaperDirect, Inc.). (No date given.)

Exhibit B2—Samples of preprinted stock (preprinted on one side) (items BC1355, BC0505, BC1065). (PaperDirect, Inc.). (No date given.)

Exhibit B3—Samples of preprinted stock (preprinted on both sides). (PaperDirect, Inc.). (No date given.)

Exhibit H—Publication entitled "Micrografx and Hallmark Cards, Inc. Announce Creative Greeting Card Software on CD–ROM" and Hallmark Connections Card Studio™. (Micrografx and Hallmark Cards, Inc.) (No date given.)

METHOD AND APPARATUS FOR BLEED-PRINTING AND METHOD AND APPARATUS FOR DECORATING A PAPER OBJECT

This application is a continuation of application Ser. No. 08/444,958, filed May 19, 1995, entitled METHOD FOR BLEED PRINTING, and now U.S. Pat. No. 5,730,826.

BACKGROUND OF THE INVENTION

1. Field of the Invention

The present invention relates to printing generally and bleed-printing on paper in particular. Bleed-printing is a method of printing on and processing a paper product so as to allow the printed matter to run off one or more edges of the printed piece after trimming. This results in the printed matter extending to the very edge of the resulting printed piece. More particularly, the present invention relates to bleed-printing on social stationery. Within this application, the term "social stationery" is meant to refer to any kind of printed paper product used as part of a social event. Examples of social stationery include greeting cards, business cards, wedding invitations, napkins, place cards, etc. In another aspect, the present invention relates to decorating a napkin.

2. Discussion of the Related Art

Bleed-printing and methods for bleed-printing are known in the art.

Conventionally, in order to print a piece of social stationery so that the printed matter extends to the edge of the social stationery, the printed matter is first printed on a piece of raw paper stock. Thereafter, the edge of the paper stock is trimmed using, for example, a paper cutter or die-cutter, to cut an edge on the paper stock so that the printing extends to this edge. In other words, the raw social stationery is typically larger than the finished social stationery product will be. The printed matter is printed onto the paper stock so that it is larger than the finished size of the social stationery product. Thereafter, the raw paper stock is trimmed to its finished product size so that the printed matter extends to the trimmed edge. In practice, this method of bleed-printing typically is not used in point of sale type personalization equipment (such as greeting card printers found in many retail establishments) because of the added cost of automatic paper cutting machinery or the need to have a clerk available to trim the raw social stationery (such as a personalized greeting card) using a paper cutter after the customer has personalized the social stationery.

In the same manner if printing close to the edge of a piece of social stationery is desired, this process of printing and trimming may also be required because many printers do not have the capability of placing printed matter closer than a predetermined distance from the edge of the raw paper stock. If the desired space between the printed matter and the edge of the finished product is smaller than the predetermined distance, than trimming is still required.

It is currently not possible to use an ink jet type printer of the type found in personalization equipment in retail establishments to bleed-print social stationery such as greeting cards. This is because a small margin surrounding the printed material is required when using an ink jet printer to prevent ink from being unintentionally applied to the paper handling mechanism in the ink jet printer. If ink is applied to the paper handling mechanism, then subsequent items of social stationery that are processed by the printer may end up with ink unintentionally applied to the social stationery. In addition, overspray from ink may interfere with operation of the paper handling mechanism within the printer. Furthermore, if printing is done too close to the edge of the raw paper stock where paper handling by a typical ink jet printer is less precise, the printed material may become smudged or distorted. Finally, some ink jet printers require a predetermined space between the edge of the printed matter and the raw paper stock and are therefore unable to print close to or at the edge of the finished paper product.

Decorating social stationery such as napkins is typically done using a hot stamping process that can be relatively expensive for printing anything other than straight lines of type. In addition, hot stamping cannot print multiple colors and, for anything other than text, requires that a custom die be made up.

Use of an ink jet printer to directly print on the napkin is not feasible because the ink from the ink jet printer tends to bleed into the napkin, thus obscuring the printed matter, as well as causing the colors to possibly mix in unintended ways due to this bleeding. In addition, since napkins are typically multiple plys and very flexible, they are not easily fed through a paper handling mechanism of an ink jet printer.

Therefore, an object of the present invention is to provide a method and apparatus that allows for bleed-printing without requiring trimming of the paper after printing.

Another object of the present invention is to provide a bleed-printed paper product, particularly a piece of social stationery.

Another object of the present invention is to provide a method and apparatus that allows for decorating a piece of social stationery, such as a napkin.

Another object of the present invention is to provide a decorated napkin.

SUMMARY OF THE INVENTION

The present invention overcomes at least the noted disadvantages by providing a method of bleed-printing a paper product, such as a piece of social stationery, including the steps of attaching the paper product to be printed to a carrier using an adhesive. The paper product is either die-cut or precut to a size smaller than the carrier. If die-cut, the paper product is die-cut without cutting the carrier. The method also includes printing on the paper product so that the printed matter extends beyond at least one edge of a die-cut portion of the paper product, and removing the paper product from the carrier. The paper product may be attached to the carrier using an adhesive. The adhesive chosen is such that the paper product is substantially free of adhesive after it is removed from the carrier. A so-called "clean-release" technology is used so that the paper product has substantially no adhesive on it after it is removed from the carrier. The adhesive may be of a type that sticks substantially to the carrier only, or that is no longer tacky after the paper product is removed from the carrier.

In accordance with another aspect of the invention, a method of bleed-printing a paper product, such as a piece of social stationery includes the step of providing a paper product having perforations extending along at least one finished edge of the paper product to provide a margin, printing on the paper product so that the printed matter extends beyond the at least one finished edge of the paper product and into the margin, and removing the margin portion from the paper product along the perforation.

The method according to the present invention thus advantageously allows bleed-printing without requiring any trimming or cutting of the finished edge of the paper product.

The invention also includes a printed product, such as a piece of social stationary, including a carrier, a paper product attached to the carrier using an adhesive, the paper product being die-cut, and printed matter disposed on the paper product so that the printed matter extends beyond at least one edge of a die-cut portion of the paper product.

In accordance with another aspect, the invention also includes a printed product, such as a piece of social stationery, including a carrier, a paper product attached to the carrier using adhesive, the paper product being pre-cut to a size smaller than the carrier so that the carrier extends beyond at least one edge of the finished paper product, and printed matter disposed on the paper product so that the printed matter extends beyond at least one edge of the finished paper product.

The invention also includes a printed product, such as a piece of social stationery, including a paper product having a perforation extending along at least one finished edge of the paper product to define a margin, and printed matter disposed on the paper product so that the printed matter extends beyond the at least one finished edge of the paper product into the margin.

In accordance with another aspect of the invention, the method includes a method of decorating a napkin, including the steps of printing printed material on a label comprising directory paper, and attaching the label to a napkin using a non-toxic adhesive.

The invention also includes a decorated napkin, including a paper napkin, a printed label comprising printed material on directory paper, and an adhesive attaching the printed label to the paper napkin.

The features and advantages of the present invention will be more readily understood and apparent from the following detailed description of the invention, which should be read in conjunction with the accompanying drawings, and from the claims which are appended at the end of the detailed description.

BRIEF DESCRIPTION OF THE DRAWINGS

In the drawings, which are incorporated herein be reference and which like elements have been given like reference characters.

DETAILED DESCRIPTION

For purposes of illustration only, and not to limit generality, the present invention will now be explained with reference to a piece of social stationery, such as a piece of paper that is to be bleed-printed. However, one skilled in the art will appreciate that the present invention may be used to bleed-print any type of paper product.

Figure 1:
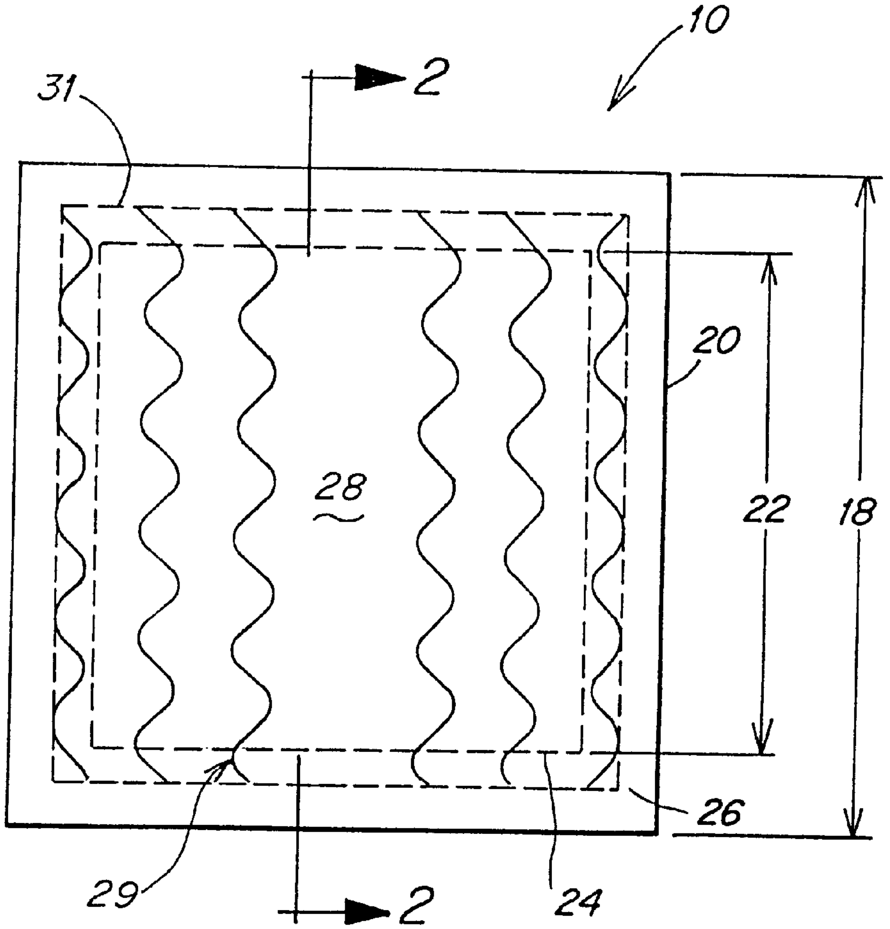
FIG. 1 is a plane view of a paper product laminate used to create social stationery in accordance with the present invention.
Figure 2:
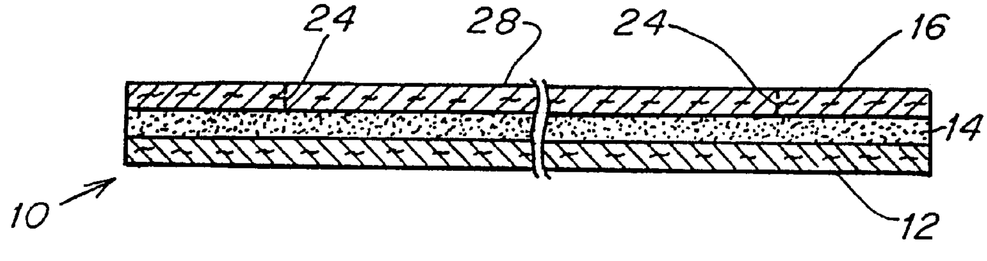
FIG. 2 is a cross sectional view of the paper product of FIG. 1 along lines 2—2.

Reference is now made to FIGS. 1 and 2 which illustrate a paper product laminate 10 that allows for bleed-printing. As shown in FIG. 2, the paper product laminate includes a carrier 12 which may be a sheet of paper. Alternatively, the carrier 12 may be a plastic sheet. The carrier 12 acts as a backing sheet for the paper product laminate.

Disposed on top of the carrier 12 is an adhesive 14. A sheet of paper 16 is placed on top of the carrier/adhesive combination. Alternatively, the adhesive 14 could be applied to sheet of paper 16 and then attached to carrier 12, or adhesive 14 could be applied to both carrier 12 and sheet of paper 16 which are then attached to each other.

The paper product laminate 10 is sized so that its overall size is larger that the finished sheet of paper. In FIG. 1, dimension 18 is the raw size of the paper product laminate along edge 20. Dimension 22 along dashed line 24 represents the size of the finished paper product. Area 26 between the raw edge 20 and the finished edge 24 is the margin.

One skilled in the art will appreciate that the square shape shown in FIG. 1 is exemplary. The margin, as well as the finished edge dimensions and the raw size dimension can be arbitrarily chosen depending upon the size and shape of the finished social stationery, the size and shape of the carrier, and so on.

To carry out the method of the present invention, the sheet of paper 16, the adhesive 14, and the carrier 12 are placed on top of each other to form the paper product laminate 10. Thereafter, the sheet of paper 16 is die-cut along dashed line 24. Dashed line 24 represents the size of the finished sheet of paper after printing. Only sheet 16 is die-cut, the carrier 12 is not cut. Thereafter, paper product laminate 10 is printed upon by a printer such as an ink jet printer. The printer is arranged so that the printed material 29 extends beyond dashed line 24 into margin 26, to, for example, dashed line 31, but not beyond the edge 20 of paper product laminate 10.

After printing has been completed, only the sheet of paper 16 occupying area 28 within dashed line 24 is removed from the paper product laminate. Since the printing has extended into the margin 26, the finished sheet of paper occupying area 28 is bleed-printed.

An important feature of the present invention is the adhesive 14 used to form the paper product laminate. Adhesive 14 is of a type that does not adhere to sheet 16 after it has been removed from the paper product laminate 10 within the die-cut area 28. Adhesive 14 may be of a type that sticks only to carrier 12. An example of this type of adhesive is found on Post-It™ Brand Notes manufactured by the 3M Company. Alternatively, adhesive 14 may be of the type used in so called “clean-release” technology. Within this disclosure, the term “clean-release” is meant to refer to adhesives that, when sheet 16 is separated from carrier 12, leave no tacky residue on either the carrier or the sheet of paper. A clean-release adhesive that may be used in the present invention is available from the Standard Register Company. This type of adhesive is advantageous because if sheet of paper 16 and carrier 14 become separated during the printing process within a printer, the parts will not stick to the printer mechanism and therefore are less likely to damage the printer. Since they are not tacky, sheet of paper 16 and carrier 12 may be easily removed from a printer if they do become separated.

The sheet of paper 16 used in paper product laminate 10, can be any paper appropriate for the specific printing process. Examples include laser paper for laser printers, coated papers for ink jet type printers, or special papers used in die sublimation printing processes.

Figure 3:
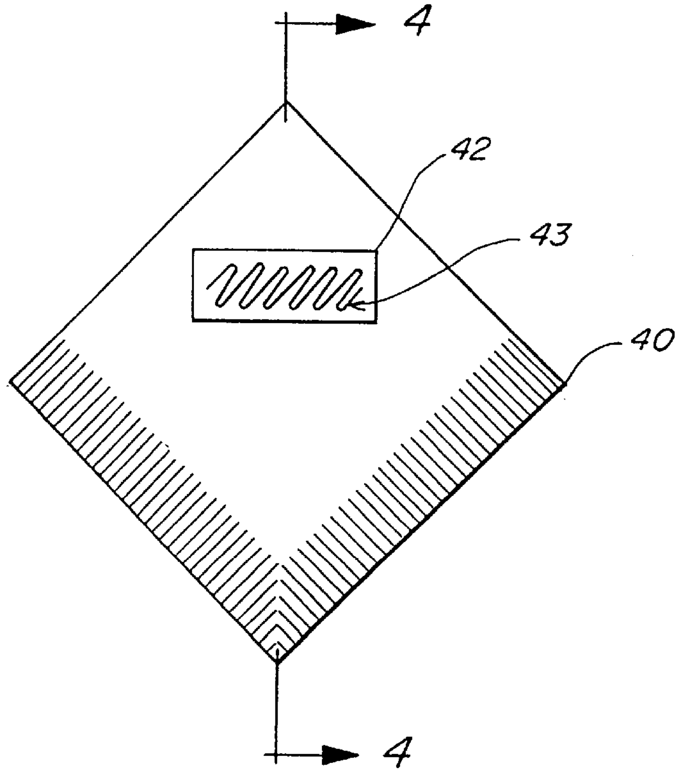
FIG. 3 is a plane view of a decorated napkin in accordance with the present invention.
Figure 4:
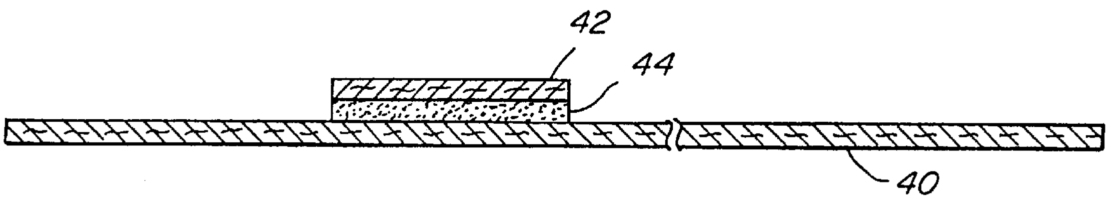
FIG. 4 is a cross sectional view along lines 4—4 of the napkin of FIG. 4.

Reference is now made to FIGS. 3 and 4, which figures illustrate a decorated napkin in accordance with the present invention.

FIG. 3 illustrates a napkin 40 having a preprinted label 42 attached thereto using a non-toxic adhesive. The napkin 40 may be any type of commonly available napkin, such as a cocktail, luncheon or dinner napkin.

As illustrated in FIG. 4, the label 42 having printed material 43 on it is attached to napkin 40 using a layer of non-toxic adhesive 44. Layer 44 is a permanent adhesive approved by the Food and Drug Administration for contact with food through a barrier.

The paper substrate of label 42 is what is commonly known as "directory paper". This paper typically has a thickness of 0.002 inches. When printed and then adhered to napkin 40, label 42 feels as though it is actually part of napkin 40, since the paper substrate of label 42 has the same feel and consistency as napkin 40. In a preferred embodiment, the paper substrate of label 42 is a 0.002 inch thick 28 pound high opaque English finish directory paper available from Champion Paper Company.

We have found that using the type of printed label on the napkin as illustrated in FIGS. 3 and 4 can provide a decorated napkin having any type of artwork or printed matter that can be printed by an ink jet printer. This is advantageous because the decorated napkin can be made to match any other artwork that may be part of a party theme or the napkin may be made to match other pieces of social stationery. We have also found that even when the napkin is folded or crumpled, label 42 remains attached to napkin 40 and the entire product still retains a napkin-like characteristic.

An important feature of the napkin illustrated in FIGS. 3 and 4 is the choice of the paper substrate for label 42. We have found that so called "directory paper" has the appropriate characteristics.

One skilled in the art will appreciate that label 42 can be manufactured using the method discussed in connection with FIGS. 1 and 2, 5 and 6, and 7.

Figure 5:
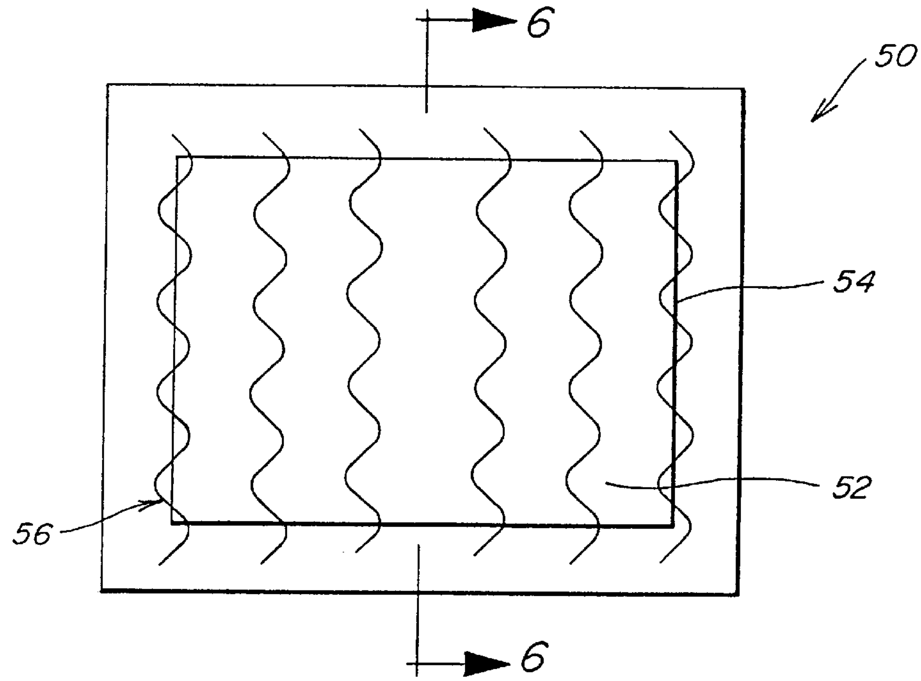
FIG. 5 is a plane view of an alternate embodiment of a paper product laminate used to create social stationery in accordance with the present invention.
Figure 6:
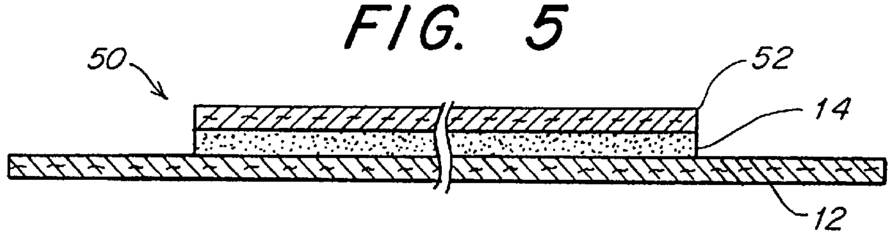
FIG. 6 is a cross sectional view of the paper product laminate of FIG. 5 along lines 6—6.

Reference is now made to FIGS. 5 and 6, which figures illustrate another embodiment of the present invention. As shown in FIGS. 5 and 6, a paper product laminate 50 includes a carrier 12, adhesive 14 and a sheet of paper 52 disposed on top of adhesive 14. In this second embodiment, all of the characteristics of carrier 12 and adhesive 14 are as described in accordance with FIGS. 1 and 2.

In this second embodiment, the sheet of paper 52 is precut so that it has smaller overall dimensions than carrier 12. Carrier 12 thus extends beyond at least one finished edge 54 of the sheet of paper 52. When sheet of paper 52 is printed upon, the printed matter 56 extends beyond the at least one finished edge 54 of the sheet of paper 52 onto carrier 12. Thereafter, the sheet of paper 52 is removed from carrier 12. Since the printed matter 56 has extended onto carrier 12, the finished sheet of paper 52 is bleed-printed. In the second embodiment, sheet of paper 52 is precut to the size of the finished paper product, rather than die cut, as illustrated in FIGS. 1 and 2.

Figure 7:
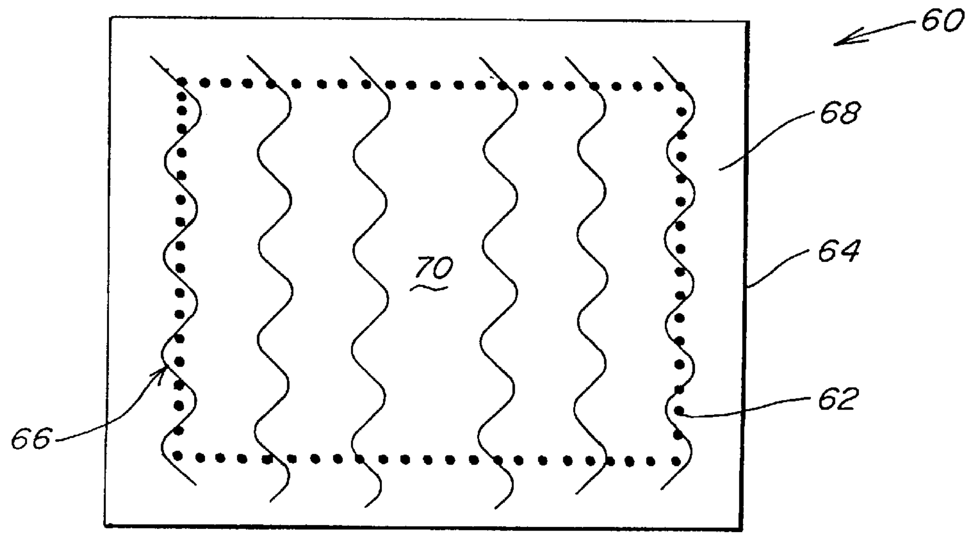
FIG. 7 is a plane view of a paper product that may be used to create social stationery in accordance with the present invention.

FIG. 7 illustrates a third embodiment of the invention. In FIG. 7, a single sheet of paper 60 having a perforated line 62 that extends along at least one edge 64 of sheet 60 is provided. Sheet 60 is then printed upon by a printer so that the printed matter 66 extends beyond the perforated line 62 into a margin 68 between the perforated line 62 and the edge 64 of sheet 60. Thereafter, when the perforations of line 62 are torn so that the margin 68 and the portion of sheet 60 occupying area 70 inside the perforated line 62 is separated, the finished sheet of paper 70 is bleed-printed.

As with the first embodiment, the second and third embodiments of the invention also advantageously allow for the finished paper product to be bleed-printed without requiring that the edges of the finished paper product be trimmed in order that the printed matter extend to the very edge of the finished paper product.

One skilled in the art will appreciate that the embodiments illustrated in FIGS. 1, 2 or 5, 6 could be arranged into an array so that multiple paper product laminates using, for example, a common carrier sheet could be provided. This allows simultaneous printing of multiple paper products.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A printed product comprising:

a carrier;

a sheet attached to the carrier with an adhesive, the sheet having a die-cut portion therein; and printed matter disposed on the sheet so that the printed matter extends beyond at least one edge of the die-cut portion of the sheet;

wherein the adhesive leaves substantially no tacky residue on the die-cut portion when it is removed from the carrier.

2. A method of bleed-printing, comprising the steps of:

perforating a sheet to form a product having a margin;

bleed-printing on the product and on the margin so that printed matter extends from the product to the margin subsequent to the step of perforating the sheet; and removing the margin.

3. The method of claim 2, wherein the removing step comprises separating the margin from the product.

4. The method of claim 2, wherein the sheet comprises a sheet of paper.

5. The method of claim 2, wherein, in said perforating step, said margin is formed so as to surround said product.

6. A method of bleed-printing, the method comprising the steps of:

forming a perforation in a sheet;

bleed-printing on the sheet so that printed matter extends across said perforation subsequent to the step of forming the perforation; and tearing said sheet along said perforation.

7. The method of claim 6, wherein said forming step comprises converting said sheet into a product having a margin.

8. The method of claim 7, wherein said bleed-printing step comprises printing on said product, across said perforation, onto said margin; and said tearing step comprises separating said product from said margin.

9. The method of claim 8, wherein, in said converting step, said margin is produced so as to surround said product.

10. A method of bleed-printing, comprising the steps of:

attaching a product to a carrier, the carrier having length and width dimensions larger than length and width dimensions of the product;

bleed-printing matter on the product and on the carrier so that printed matter extends from the product onto the carrier; and removing the product from the carrier.

11. The method of claim 10, wherein the attaching step comprises attaching the product to the carrier with an adhesive.

12. The method of claim 11, wherein the adhesive remains on the carrier when the product is removed from the carrier.

13. The method of claim 10, wherein the product comprises a sheet of paper.

14. The method of claim 10, wherein, in said attaching step, said product is attached to said carrier in such a way that, after the removing step, the product is substantially free of tacky residue.

15. A method of bleed-printing, comprising the steps of:

attaching a product to a carrier, at least one dimension of the carrier being larger than at least one dimension of the product;

bleed-printing on the product and on the carrier so that printed matter extends from the product onto the carrier; and removing the product from the carrier.

16. The method of claim 15, wherein, in said attaching step, said product is attached to said carrier in such a way that, after the removing step, the product is substantially free of tacky residue.

17. The method of claim 15, wherein said at least one dimension of said carrier is at least one of a length dimension and a width dimension.

18. The method of claim 17, wherein said at least one dimension of the product is at least one of a length dimension and a width dimension.

19. A method of bleed-printing comprising the steps of:

attaching a sheet to a carrier with an adhesive;

forming a product in the sheet;

bleed-printing on the sheet so that printed matter extends beyond at least one edge of the product subsequent to the step of forming the product; and removing the product from the carrier;

wherein, after the removing step, the product is substantially free of tacky residue from the adhesive.

20. The method of claim 19, wherein said forming step is executed by die-cutting said product in said sheet.

21. The method of claim 19, wherein, in the attaching step, the sheet is attached to the carrier with an adhesive that, after the removing step, substantially adheres to the carrier only.

22. A method of bleed-printing comprising the steps of:

attaching a product to a carrier with an adhesive;

bleed-printing on the product so that printed matter extends beyond at least one edge of the product; and removing the product from the carrier;

wherein, after the removing step, the product is substantially free of tacky residue from the adhesive.

23. The method of claim 22, wherein at least one dimension of the carrier is larger than at least one dimension of the product.

24. The method of claim 23, wherein said at least one dimension of said carrier is at least one of a length dimension and a width dimension.

25. The method of claim 24, wherein said at least one dimension of the product is at least one of a length dimension and a width dimension.

26. The method of claim 10, 15, 19 or 22, wherein said carrier is made of paper.

27. The method of claim 10, 15, 19 or 22, wherein said carrier is made of plastic.

28. The method of claim 2, 6, 10, 15, 19 or 22, wherein said bleed-printing step comprises using a printer to print said printed matter.

29. The method of claim 2, 6, 10, 15, 19 or 22, wherein said bleed-printing step comprises using an ink jet printer to print said printed matter.

30. The method of claim 2, 6, 10, 15, 19 or 22, wherein said bleed-printing step comprises using a laser printer to print said printed matter.

31. The method of claim 2, 6, 10, 15, 19 or 22, wherein said bleed-printing step comprises die sublimation printing said printed matter.

32. The method of claim 2, 6, 10, 15, 19 or 22, wherein said product is an article of social stationery.

33. The method of claim 2, 6, 10, 15, 19 or 22, wherein said product is a greeting card.

* * * * *